United States Patent
Wallace (10) Patent No.: US 9,217,108 B2
(45) Date of Patent: Dec. 22, 2015

(54) SYSTEM AND METHOD FOR PRODUCING A GYPSUM SLURRY FOR IRRIGATION

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 0 days.

(21) Appl. No.: 13/965,626

(22) Filed: Aug. 13, 2013

(65) Prior Publication Data

US 2014/0044485 A1 Feb. 13, 2014

Related U.S. Application Data

(60) Provisional application No. 61/682,612, filed on Aug. 13, 2012.

(51) Int. Cl.
  *C09K 17/06* (2006.01)
  *A01G 25/00* (2006.01)
  *B01D 61/44* (2006.01)

(52) U.S. Cl.
  CPC ........... *C09K 17/06* (2013.01); *A01G 25/00* (2013.01); *B01D 61/44* (2013.01)

(58) Field of Classification Search
  USPC ................................. 405/36, 52; 137/4, 92
  See application file for complete search history.

(56) References Cited

U.S. PATENT DOCUMENTS

| | | | |
|---|---|---|---|
| 3,584,997 A * | 6/1971 | Gerry | 423/157.3 |
| 4,127,235 A | 11/1978 | Klaile et al. | |
| 4,163,046 A | 7/1979 | Subramanian et al. | |
| 4,298,442 A | 11/1981 | Giuffrida | |
| 4,381,232 A | 4/1983 | Brown | |
| 4,405,463 A | 9/1983 | Jost et al. | |
| 4,436,429 A * | 3/1984 | Strong et al. | 366/2 |
| 4,725,425 A | 2/1988 | Lesher et al. | |
| 5,221,528 A | 6/1993 | Jongema | |
| 5,250,185 A | 10/1993 | Tao et al. | |

(Continued)

FOREIGN PATENT DOCUMENTS

| WO | 2007094659 A1 | 8/2007 |
|---|---|---|
| WO | 2014028465 A1 | 2/2014 |

OTHER PUBLICATIONS

Mcdonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).

(Continued)

*Primary Examiner* — Sean Andrish
(74) *Attorney, Agent, or Firm* — Fletcher Yoder, PC (57) ABSTRACT

In one embodiment, a method includes providing agricultural grade gypsum to a mixing device using a conveyor, providing a fluid to the mixing device using a pump, mixing the agricultural grade gypsum with the fluid to produce a gypsum slurry using the mixing device, and pumping the gypsum slurry to a storage tank. In another embodiment a system includes a conveyor providing an agricultural grade gypsum, a pump providing a fluid, a mixing device configured to mix the agricultural grade gypsum provided by the conveyor with the fluid provided by the pump to produce a gypsum slurry, and a slurry pump configured to pump the gypsum slurry from the mixing device to a storage tank.

14 Claims, 5 Drawing Sheets

(56) References Cited

U.S. PATENT DOCUMENTS

| | | | |
|---|---|---|---|
| 5,366,514 | A | 11/1994 | Becnel, Jr. et al. |
| 5,417,491 | A | 5/1995 | Hornung et al. |
| 5,452,954 | A * | 9/1995 | Handke et al. ............... 366/16 |
| 5,765,945 | A | 6/1998 | Palmer |
| 5,858,240 | A | 1/1999 | Twardowski et al. |
| 5,925,255 | A | 7/1999 | Mukhopadhyay |
| 6,030,535 | A | 2/2000 | Hayashi et al. |
| 6,036,740 | A | 3/2000 | Miller et al. |
| 6,039,470 | A * | 3/2000 | Conwell ..................... 366/137 |
| 6,183,644 | B1 | 2/2001 | Adams et al. |
| 6,322,693 | B1 * | 11/2001 | Southall ..................... 210/85 |
| 6,461,491 | B1 | 10/2002 | Hryn et al. |
| 6,482,305 | B1 | 11/2002 | Mani |
| 7,083,730 | B2 | 8/2006 | Davis |
| 7,147,361 | B2 | 12/2006 | Cecala et al. |
| 7,392,848 | B1 | 7/2008 | Bader |
| 7,459,088 | B2 | 12/2008 | Davis |
| 7,501,064 | B2 | 3/2009 | Schmidt et al. |
| 7,595,001 | B2 | 9/2009 | Arakel et al. |
| 7,861,955 | B2 | 1/2011 | Tracy et al. |
| 2005/0088909 | A1 * | 4/2005 | Cecala et al. ............ 366/152.4 |
| 2007/0189945 | A1 | 8/2007 | Kopp et al. |
| 2008/0185340 | A1 | 8/2008 | Bargeman et al. |
| 2008/0237123 | A1 | 10/2008 | Marston |
| 2008/0283295 | A1 * | 11/2008 | Eia ............................. 175/46 |
| 2009/0127360 | A1 | 5/2009 | Tracy et al. |
| 2010/0163471 | A1 | 7/2010 | Elyanow et al. |
| 2011/0198285 | A1 | 8/2011 | Wallace |
| 2011/0289847 | A1 | 12/2011 | Shaw et al. |
| 2011/0303607 | A1 | 12/2011 | Vora et al. |
| 2014/0041810 | A1 | 2/2014 | Wallace |
| 2014/0042029 | A1 | 2/2014 | Wallace |
| 2014/0042061 | A1 | 2/2014 | Wallace |
| 2014/0045248 | A1 | 2/2014 | Wallace |

OTHER PUBLICATIONS

Markus Busch, William E. Mickols, Steve Jons, Jorge Redondo, Jean De Witte, "Boron Removal in Sea Water Desalination," International Desalination Association, BAH03-039.

NRS Engineering Water Solutions, "Final Pilot Study Report—Texas Seawater Desalination Demonstration Project," (Oct. 2008).

Collin Green "Using Gypsum for the Treatment of Mine Water," Department of Chemical and Metallurgical Engineering, Faculty of Natural Sciences, Technikon Pretoria (Dec. 2003).

Stephen R. Grattan "Irrigation Water Salinity and Crop Production," University of California, Davis—Agriculture and Natural Resources, ANR Publication 8066 (2002).

Ittai Gavrieli Amos Bein, and Aharon Oren, "The Expected Impact of the Peace Conduit Project (The Red Sea Dead Sea Pipeline) on the Dead Sea," Mitigation and Adaptation Strategies for Global Change, 10:3-22 (2005).

DOW Water Solutions, "Filmtec™ Reverse Osmosis Membranes," Technical Manual, Form No. 609-00071; pp. 1-180.

DOW Water Solutions, "DOWTM Filmtec™ Membranes—DOW™ Filmtec™ SW30XLE-440i Seawater Reverse Osmosis Element with iLEC Interlocking Endcaps," Product Information. Form No. 609-03003-1109; pp. 1-2.

DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; pp. 1-2.

DOW Water Solutions, "Filmtec™ Membranes—Filmtec™ XLE-440 Extra Low Energy RO Element," Product Information. Form No. 609-00245-0606; pp. 1-2.

DOW Water Solutions, "DOW Ultrafiltration—High Turbidity and Temperature Fluctuation No Obstacle for DOW™ Ultrafiltration," Case History, Form No. 795-00020-1108; pp. 1-5.

FAO Corporate Document Repository, Agriculture and Consumer Protection, "Water Quality for Agriculture"; http://www.fao.org/DOCREP/003/T0234E/T0234E05.htm (Feb. 10, 2010) pp. 1-15.

Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.

GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.

GE Power & Water—Water & Process Technologies, "HERO" (2010) pp. 1-2.

ICL, "Harnessing Nature Creating Value," 3rd Annual NASDAQ-TASE Israeli Investor Conference, New York (Sep. 18, 2008) pp. 1-47.

Applied Membranes, Inc., "Water Treatment Guide—Temperature Correction Factor for Reverse Osmosis Membranes," (2007) pp.1-2.

Nitto Denko and Hydranautics, "Chemical Pretreatment for RO and NF," Technical Application Bulletin No. 111, Revision C (Dec. 2008) pp. 1-16.

Chemical Processing.com, "To Avoid Silica-Scale Problems in Cooling Towers, Plant Personnel Turn to Unconventional Methods," Water Treatment's Gordion Knot; http://www.chemicalprocessing.com/articles/2003/235. html?page=print; (2003) pp. 1-9.

"Desalination: A National Perspective," Committee on Advancing Desalination Technology, National Research Council, The National Academies—Advisers to the Nation on Science, Engineering, and Medicine (2008) pp. 1-255.

Public Health and the Environment World Health Organization, "Desalination for Safe Water Supply—Guidance for the Health and Environmental Aspects Applicable to Desalination," Geneva (2007) pp. 1-173.

Gerald L. Mackie and Barb Crosbie, "Zebra Mussel Biofouling Control in Cottage and Other Small Volume Water Systems," The Georgian Bay Association (1999) pp. 1-87.

Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem., vol. 13, No. 3, (2007) 452-456.

EPA Selenium Purification_Scandium pp.

Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.

Reclamation—Managing Water in the West, Desalination and Water Purification Research and Development Program Report No. 135, Pilot Testing of Zero-Discharge Seawater Desalination-Application to Selenium Removal from Irrigation Drainage, U.S. Department of the Interior Bureau of Reclamation, Apr. 2008, pp. 1-37.

Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.

T. Masuzawa, "Impurities Contained Inside the Crystals of Solar and Vacuum Evaporated Salts,"Fifth International Symposium on Salt—Northern Ohio Geological Society, May 29-Jun. 1, 1979, Hamburg, Germany, pp. 463-473.

Seung Joon Kim, Young Geun Lee, Sanghoun Oh, Yun Seok Lee, Young Mi Kim, Moon Gu Jeon, Sangho Lee, In S. Kim, Joon Ha Kim, "Energy saving methodology for the SWRO desalination process: controrl of operating temperature and pressure," Desalination 249 (2009) 260-270.

Peter Eriksson, Markus Kyburz, Wil Pergande, "NF membrane characteristics and evaluation for sea water processing applications," Desalination 184 (2005) 281-294.

EPA Selenium Purification pp. 1-8.

* cited by examiner

SYSTEM AND METHOD FOR PRODUCING A GYPSUM SLURRY FOR IRRIGATION

CROSS REFERENCE TO RELATED APPLICATIONS

This application benefits from the priority of U.S. Provisional Patent Application No. 61/682,612, entitled "System for Producing a Gypsum Slurry for Irrigation," filed Aug. 13, 2012, which is hereby incorporated by reference in its entirety.

The following applications are incorporated by reference in their entirety:
U.S. Provisional Patent Application No. 61/682,585, entitled "System for Removing Minerals from a Brine Using Electrodialysis" filed Aug. 13, 2012,
U.S. Provisional Patent Application No. 61/682,590, entitled "Heating System for Desalination" filed Aug. 13, 2012,
U.S. Provisional Patent Application No. 61/682,596, entitled "System for Removing High Purity Salt from a Brine" filed Aug. 13, 2012,
U.S. Provisional Patent Application No. 61/682,603, entitled "System for Rinsing Electrodialysis Electrodes" filed Aug. 13, 2012, and
U.S. Provisional Patent Application No. 61/682,609, entitled "System for Removing Selenium from a Feed Stream" filed Aug. 13, 2012.

BACKGROUND

The subject matter disclosed herein relates generally to irrigation and, more particularly, to a system for preparing gypsum slurry for irrigation.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, innovative irrigation techniques for farm lands, parks, golf courses, and may be used.

For instance, high efficiency irrigation used in arid regions may use reclaimed water and/or treated waste water. However, using reclaimed water and/or treated waste water may lead to soil degradation. For example, sodium salts and carbonates may accumulate in the soil resulting in absorption ratio toxicity in plants due to the increased sodium to calcium ratio in the water surrounding the plant roots. Furthermore, high sodium content in plant soil may cause soil crusting which may inhibit irrigation water from efficiently permeating the soil and reaching plant roots. Moreover, excess carbonate soil build-up may elevate soil pH and cause various plant nutrients to become insoluble, thus limiting the ability of plants to absorb nutrients for plant growth.

Gypsum may be used to improve soil quality. For example, gypsum may be used to increase the calcium content of the irrigation water and lower the sodium content in the soil. However, when gypsum is applied to soil as a powder, dusting issues, root absorption problems, and soil crusting may result. In some applications, irrigation water and a gypsum slurry may be injected directly into the soil and to the roots of plants using a drip irrigation system. In such applications, the gypsum slurry may be added to the drip irrigation system and applied directly to the soil in a localized manner. With the addition of the gypsum slurry to the irrigation water, application of gypsum may occur during the plant growing season and may perform soil conditioning without harming crops. However, scaling and plugging may occur within a drip irrigation systems because of the gypsum slurry in the irrigation water.

BRIEF DESCRIPTION

In one embodiment, a method includes providing an agricultural grade gypsum to a mixing device using a conveyor, providing a fluid to the mixing device using a pump, mixing the agricultural grade gypsum with the fluid to produce a gypsum slurry using the mixing device, and pumping the gypsum slurry to a storage tank using a slurry pump.

In another embodiment, a system includes a conveyor providing an agricultural grade gypsum, a pump providing a fluid, a mixing device configured to mix the agricultural grade gypsum provided by the conveyor with the fluid provided by the pump to produce a gypsum slurry, and a slurry pump configured to pump the gypsum slurry from the mixing device to a storage tank.

In another embodiment, a method includes providing a raw irrigation water to an irrigation water pipeline at a raw irrigation water injection point using a raw irrigation water pump, providing an acid to the irrigation water pipeline at an acid injection point downstream of the raw irrigation water injection point using an acid pump, providing a gypsum slurry to the irrigation water pipeline at a gypsum slurry injection point downstream of the acid injection point using a gypsum slurry pump, providing a bleach to the irrigation water pipeline at a bleach injection point using a bleach pump to produce a raw irrigation water mixture, and filtering the raw irrigation water mixture using a filter to produce a treated irrigation water.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
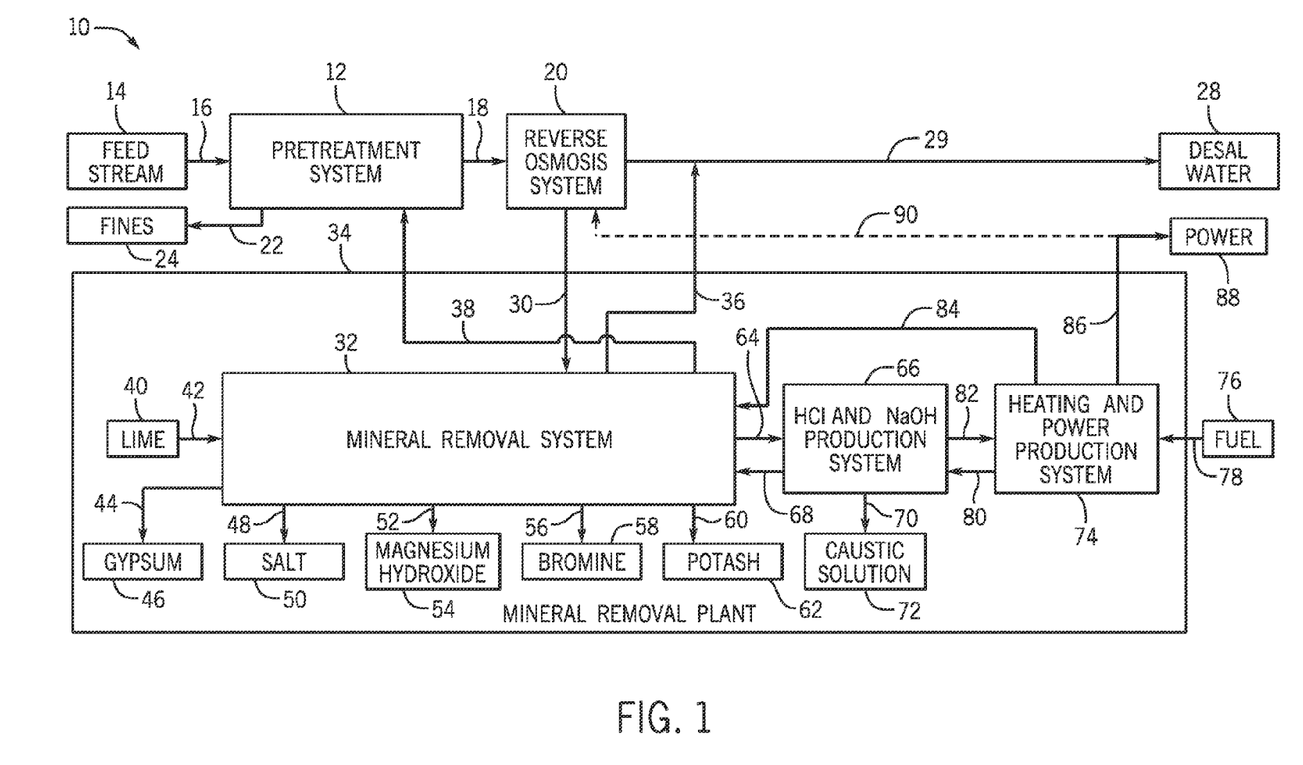
FIG. 1 is a block diagram of an embodiment of a water processing system, in accordance with aspects of the present disclosure.

FIG. 1 is a block diagram of an embodiment of a water processing system 10. The water processing system 10 is used to produce desalinated water from a feed stream and to remove minerals from the feed stream. For example, the water processing system 10 may be used to produce high purity agricultural grade gypsum (e.g., approximately greater than 97 wt % gypsum on a dry basis), industrial grade caustic (e.g., approximately greater than 97 wt % NaOH on a dry basis), industrial grade magnesium hydroxide (e.g., approximately greater than 98 wt % MgO on an ignited basis, or on an ignited oxide basis) suitable for industrial magnesia refractory, industrial grade sodium chloride (e.g., approximately greater than 99.9 wt % NaCl on a dry basis), and/or desalinated water (e.g., approximately less than 1000 wppm total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14 as an input 16. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca+Mg, and/or approximately 0.01 to 0.30 g/l $SiO_2$. Furthermore, in certain embodiments, the feed stream 14 may have a pH range between approximately 5 and 9. Specifically, the feed stream 14 may have a pH of approximately 8.

The pretreatment system 12 receives the feed stream 14 and removes solid materials (e.g., fines) from the feed stream 14. The pretreatment system 12 provides the pretreated feed stream 14 as a first output 18 to a reverse osmosis (RO) system 20. Moreover, the pretreatment system 12 provides a second output 22 that contains fines 24, such as iron (Fe) and manganese (Mn). The RO system 20 receives the pretreated feed stream 14 and produces desalinated water 28 as a first output 29. In certain embodiments, the desalinated water 28 may include $SiO_2$. Moreover, the desalinated water 28 may have a pH of approximately 7.5. Furthermore, the RO system 20 provides a brine stream as a second output 30 to a mineral removal system 32. In certain embodiments, the desalinated water 28 may be approximately 70 to 90 percent of the output from the RO system 20, and the brine stream may be approximately 10 to 30 percent of the output from the RO system 20. Specifically, in some embodiments, the desalinated water 28 may be approximately 80 percent of the output from the RO system 20, and the brine stream may be approximately 20 percent of the output from the RO system 20. As may be appreciated, while the illustrated embodiment uses the RO system 20, other embodiments may use NF in place of RO.

The mineral removal system 32 is part of a mineral removal plant 34. The mineral removal plant 34 is configured to remove minerals, elements, and/or compounds from the brine stream. As may be appreciated, the brine stream may be provided to the mineral removal plant 34 from any suitable source and/or system. In certain embodiments, the brine stream may include substantial amounts of sodium chloride, sulfate, calcium, and/or magnesium. The mineral removal system 32 may provide one or more outputs 36 that include desalinated water (which may contain silicon dioxide). Furthermore, the one or more outputs 36 may include a disinfectant and/or oxidant. The disinfectant and/or oxidant may be provided to the pretreatment system 12 via an output 38.

A lime based material 40 (e.g., lime, quick lime, dolomitic lime, etc.) may be provided to an input 42 of the mineral removal system 32 to facilitate mineral removal from the brine stream. The mineral removal system 32 may be configured to remove any suitable mineral, elements, and/or compounds from the brine stream. For example, the mineral removal system 32 may provide a first output 44 including gypsum 46 (e.g., agricultural grade gypsum), a second output 48 including salt 50 (e.g., industrial grade sodium chloride), a third output 52 including magnesium hydroxide 54 (e.g., industrial grade magnesium hydroxide), a fourth output 56 including bromine 58, and/or a fifth output 60 including potash 62.

In certain embodiments, the mineral removal system 32 may provide one or more outputs 64 to a hydrochloric acid (HCl) and sodium hydroxide (NaOH) production system 66. Furthermore, the mineral removal system 32 may receive one or more inputs 68 from the HCl and NaOH production system 66. For example, the mineral removal system 32 may provide a sodium chloride brine to the HCl and NaOH production system 66. Moreover, the mineral removal system 32 may receive HCl, caustic, and/or NaOH produced by the HCl and NaOH production system 66. In certain embodiments, the HCl and NaOH production system 66 may provide an output 70 of a caustic solution 72 (e.g., NaOH) or HCl solution that is not used by the mineral removal system 32 (e.g., produced to be sold).

The mineral removal plant 34 also includes a heating and power production system 74. In certain embodiments, the heating and power production system 74 may include a natural gas engine and/or a boiler. The heating and power production system 74 is configured to receive a fuel 76 at an input 78. The fuel 76 may be any suitable fuel, such as natural gas. The heating and power production system 74 is configured to provide one or more outputs 80 to the HCl and NaOH production system 66. The one or more outputs 80 may include power, steam, hot water, any suitable heated fluid, and so forth. Moreover, the heating and power production system 74 is configured to receive a cooled fluid (such as water) via one or more inputs 82. As illustrated, the heating and power production system 74 is configured to provide power to the mineral removal system 32 via a first output 84. Moreover, the heating and power production system 74 includes a second output 86 configured to provide power 88 to another system and/or to provide a power output 90 to the RO system 20.

Figure 2:
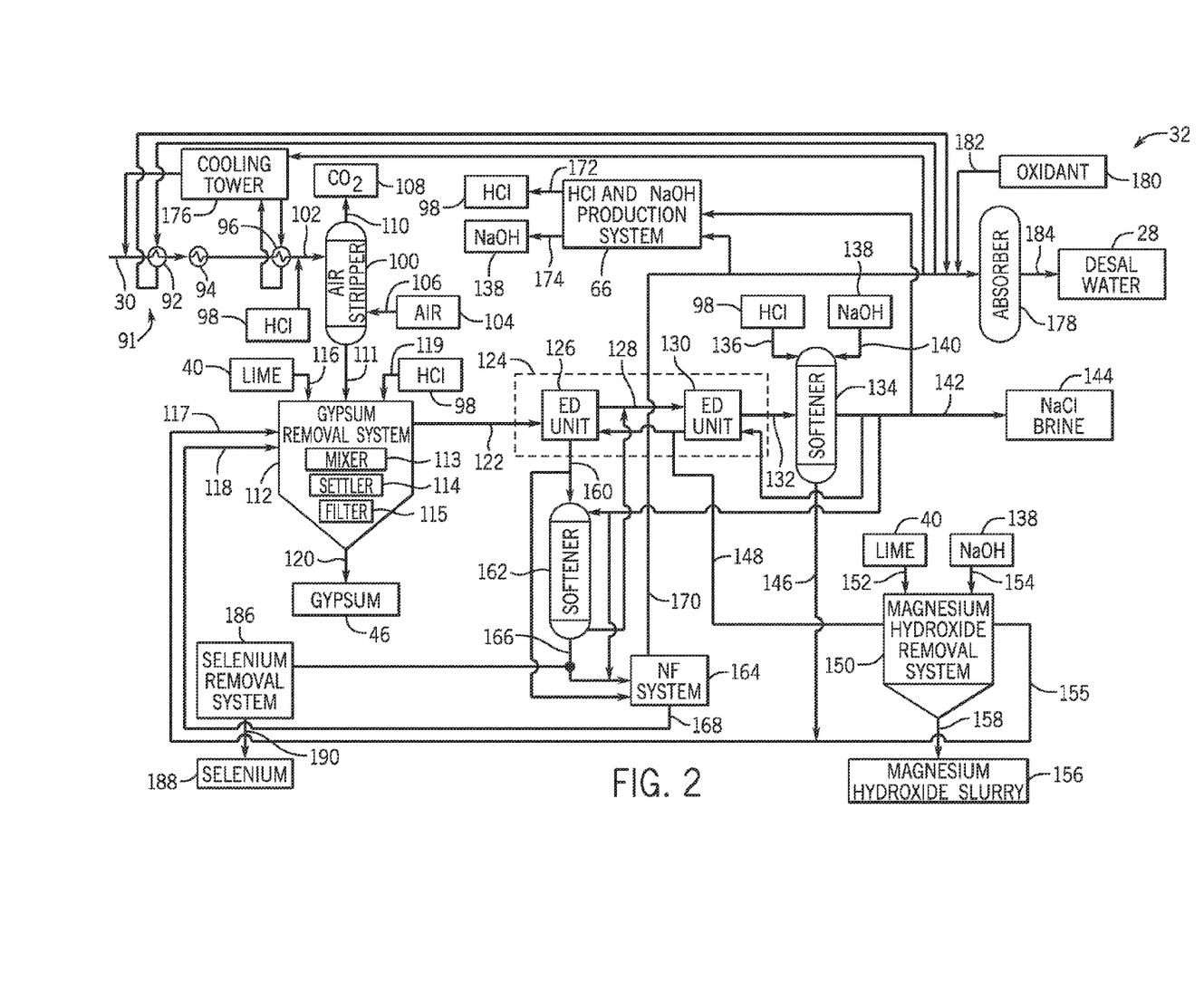
FIG. 2 is a block diagram of an embodiment of a mineral removal system, in accordance with aspects of the present disclosure.

FIG. 2 is a block diagram of an embodiment of the mineral removal system 32. As previously described, the mineral removal system 32 receives at an input the brine stream from the output 30 of the RO system 20. As may be appreciated, the brine stream may contain various elements and/or compounds. For example, the brine stream may contain NaCl, $SO_4$, Ca, Mg, and/or $SiO_2$. In certain embodiments, the brine stream may contain approximately 3.0 to 8.0 g/l NaCl, approximately 3,000 to 8,000 weight parts per million (wppm) $SO_4$, approximately 100 to 400 wppm Mg, approximately 200 to 600 wppm Ca, and/or approximately 50 to 200 wppm $SiO_2$. Furthermore, in certain embodiments, the brine stream may have a pH range between approximately 4 and 8. Specifically, the brine stream may have a pH of approximately 6. In the illustrated embodiment, a temperature control system 91 is used to control heating of the brine stream. Moreover, the temperature control system 91 includes a first heat exchanger 92, a second heat exchanger 94, and a third heat exchanger 96 to aid in controlling the temperature of the brine stream.

The brine stream is mixed with HCl 98 to convert bicarbonate ($CHO_3$) and carbonate ($CO_3$) in the brine stream to $CO_2$, thereby decreasing the pH to approximately less than 4. The acidified brine stream is routed to an air stripper 100 via a first input 102. The air stripper 100 uses air 104 provided to a second input 106 of the air stripper 100 to facilitate removal of the $CO_2$ 108 from the brine stream via a first output 110. In certain embodiments, multiple stages are used in the air stripper 100 to enable a low residual (e.g., less than approximately 2 ppm). As may be appreciated, a low $CO_2$ residual may inhibit carbonate reformation and scaling when the pH of the brine stream is increased during the various downstream brine treatment steps.

The $CO_2$ stripped brine stream is provided via a second output 111 of the air stripper 100 to a gypsum removal system 112. The gypsum removal system 112 may include a mixer 113, a settler 114, and a filter 115 to facilitate removal of the gypsum 46 from the brine stream (e.g., feed stream). Accordingly, within the mixer 113, the $CO_2$ stripped brine stream is mixed with: the lime based material 40 (e.g., lime, quick lime, dolomitic lime, etc.) received by a first input 116 of the gypsum removal system 112, recycled concentrated calcium chloride ($CaCl_2$) brine (e.g., such as a brine containing approximately 4 to 25 wt % $CaCl_2$) received by a second input 117, and recycled NF non-permeate (e.g., a sodium sulfate ($Na_2SO_4$) rich brine) received by a third input 118. In certain embodiments, such as embodiments with feed brines having a lower $Na_2SO_4$ content, the second output 111 may bypass the gypsum removal system 112. Accordingly, only the second input 117 and the third input 118 may be provided to the gypsum removal system 112. Furthermore, in such an embodiment, the second output 111 may be mixed with a brine output stream 122 from the gypsum removal system 112.

HCl 98 may be added to the gypsum removal system 112 via a fourth input 119. In certain embodiments, the lime based material 40 and the HCl 98 may be pre-mixed into the recycle calcium chloride brine stream to increase calcium content in the mixer 113 of the gypsum removal system 112 and/or in the mineral removal system 32. For example, this may be beneficial when the $SO_4$ to (Mg+Ca) molar ratio is greater than approximately 1.0 since it provides supplemental calcium to allow substantial (e.g., complete, nearly complete, etc.) sulfate removal as gypsum 46. In other embodiments, commercial calcium chloride brine, flakes, or pellets may be added to the mixer 113 of the gypsum removal system 112 when the brine stream is deficient in calcium. Furthermore, in certain embodiments, HCl 98 and limestone may also be added to the recycle calcium chloride brine and the brine stripped in a second air stripper to remove the residual $CO_2$. As may be appreciated, limestone may be procured at a lower cost than lime; however, the second air stripper may be necessitated by the use of the limestone.

The overall molar ratio of Ca to $SO_4$ in the brine stream entering the gypsum removal system 112 may be controlled to approximately 0.8 to 1.2 by calcium addition to the mixer 113 (e.g., HCl 98 plus the lime based material 40, $CaCl_2$, and/or HCl 98 plus limestone with additional air stripping) as discussed above, and/or by removing a portion of the concentrated $CaCl_2$ brine as a byproduct. Recycled gypsum 46 seed crystals are added to the mixture within the mixer 113 of the gypsum removal system 112. The calcium in the concentrated $CaCl_2$ brine stream reacts with the sulfate in the brine stream received by the gypsum removal system 112 from the air stripper 100 and the recycle NF non-permeate to precipitate gypsum 46. In certain embodiments, approximately 50% to 70% of the sulfate is removed from the brine stream. The presence of gypsum 46 seed crystals in the mixer 113 (e.g., a turbulent mixer) at neutral pH (e.g., a pH of approximately 6 to 8) may facilitate gypsum 46 precipitation kinetics, thereby enabling rapid gypsum precipitation. At the mixer 113 effluent the solution reaches near saturation conditions (e.g., slightly supersaturated) with respect to gypsum 46 and the slurry is pumped to the settler 114.

In addition to gypsum 46 precipitation, insoluble calcium fluoride ($CaF_2$) also precipitates in the mixer 113 thereby removing a substantial portion of the fluoride from the stripped brine stream; thereby inhibiting fluoride scaling in the electrodialysis (ED) system. In the settler 114 the gypsum 46 crystals settle and the saturated near solids free solution is decanted off, and filtered by the filter 115 (e.g., a sand filter, a microfilter, an ultrafilter, and so forth) to remove residual gypsum 46 particles. A small amount of softened salt brine is recycled to the settler 114 overflow to increase gypsum 46 solubility and desaturate the brine stream, thereby inhibiting scaling in the filter 115 and other downstream units. The settler 114 bottoms may be routed to a hydroclone and filter to wash (e.g., with desalinated product water) and concentrate the gypsum 46 into a saleable washed filter cake. In certain embodiments, the filter cake may include approximately 70 to 100 wt % gypsum 46. Specifically, the filter cake may include approximately 90 wt % gypsum 46. Thus, gypsum 46 is provided as an output 120 from the gypsum removal system 112. The fine solids overflow stream from the hydroclone is recycled to the mixer 113 as seed crystals. The filtrate from the filter 115 is recycled to the settler 114.

The gypsum removal system 112 may remove approximately 60 to 75% of the gypsum received from the second output 111 and produces the brine stream output 122 having a reduced amount of gypsum relative to the second output 111. For example, the brine stream output 122 (e.g., recycle brine stream output) may contain less than approximately 5 g/l gypsum, while the second output 111 may contain approximately 12 to 20 g/l gypsum. Furthermore, in certain embodiments, the brine stream output 122 may contain approximately 5.0 to 15.0 g/l NaCl and/or approximately 1,000 to 3,000 wppm $SO_4$. Moreover, the brine stream output 122 may have a pH of approximately 6. The brine stream output 122 is provided to an electrodialysis (ED) system 124. Furthermore, as illustrated, the gypsum removal system 112 is fluidly coupled to the ED system 124. In certain embodiments, a guard cartridge filter may be disposed between the brine stream output 122 and the ED system 124 to filter the brine stream output 122 thereby blocking gypsum scale from passing to the ED system 124. The ED system 124 is configured to receive the brine stream output 122 from the gypsum removal system 112, to produce a substantially sulfate hardness (e.g., Ba, Sr, Ca) free sodium sulfate solution, to produce a sodium chloride solution, and to produce a mineral solution. In the illustrated embodiment, the ED system 124 includes a first ED unit 126 that provides an intermediate output 128 to a second ED unit 130. In certain embodiments, the intermediate output 128 may include approximately 70 to 120 g/l total dissolved solids (TDS).

The first ED unit 126 (e.g., mixed chloride extraction ED) extracts a substantial portion (e.g., approximately 65% to 80%) of the magnesium chloride, calcium chloride, and sodium chloride from the brine stream output 122 using non-permselective cationic membranes and monovalent permselective anionic membranes to produce a concentrated (e.g., approximately 3 to 25 wt %) barium chloride, strontium chloride, magnesium chloride, calcium chloride, sodium chloride brine that is substantially sulfate free that is provided via the intermediate output 128 to the second ED unit 130. At a pH of approximately 6 both boric acid and silica are in a non-ionic form and thus are not extracted by the ED into the intermediate output 128 having the concentrated brine stream. As may be appreciated, barium (Ba), strontium (Sr), magnesium, and calcium chlorides are preferentially extracted versus sodium chloride through non-permselective cation membranes. Thus, a diluate brine output 160 from the first ED unit 126 is a dilute $Na_2SO_4$ brine with reduced barium, strontium, calcium, and magnesium content and very low chloride content (e.g., a substantially sulfate hardness free sodium sulfate solution). For example, the substantially sulfate hardness free sodium sulfate solution may include less than approximately 200 mg/l (Ca+Sr+Ba) and/or approximately 3 to 5 g/l sulfate.

In certain embodiments, the first ED unit 126 may include a two-stage ED configuration for mixed chloride extraction ED. For example, a first stage may extract approximately 70-90% of the mixed chlorides as a low sulfate, high concentration product concentrate. Furthermore, a second stage may be fed by the first stage diluate and the brine stream output 122. Residual mixed chlorides in the first stage diluate may be extracted into the brine stream output 122, which may be fed to the first stage. As may be appreciated, the two-stage design may increase ED power consumption and size, however, the two-stage design may facilitate a sharper separation and higher recoveries of sulfate in relation to the diluate product and chloride in relation to the mixed chloride concentrate product.

In some embodiments, a portion of an NF non-permeate from a segregated fully softened feed may be used as a supplemental rinse solution in cells adjacent to the electrode cells, thereby inhibiting calcium contamination of an electrode rinse solution. The return supplemental rinse solution may be recycled to the gypsum settler 114. Moreover, for seawater based brines, NF permeate may be used as a supplemental rinse solution (due to its high salt content and higher conductivity) which may be recycled back to the NF feed.

The high concentration calcium chloride brine from the intermediate output 128 is provided to the second ED unit 130 (e.g., a NaCl extraction ED) that selectively removes a substantial portion (e.g., approximately 80% to 95%) of the NaCl using monovalent permselective cation and anion membranes. In certain embodiments, the second ED unit 130 may include a two-stage ED configuration for NaCl extraction. For example, a first stage may extract approximately 70 to 90% of the NaCl as a low hardness, high concentration product concentrate. Moreover, the second stage may be fed by the first stage diluate and may produce a low NaCl, $CaCl_2$, $MgCl_2$ rich product diluate, and an intermediate concentration NaCl concentrate with higher hardness, which is recycled back to the feed of the first stage. As may be appreciated, the two-stage design may increase ED power consumption and size; however, the two-stage design may allow for a sharper separation and higher recoveries of $CaCl_2$ and $MgCl_2$ in relation to the diluate product and NaCl in relation to the concentrate product.

A NaCl brine (e.g., sodium chloride solution) is provided as an output 132 from the second ED unit 130. The NaCl brine has a low magnesium content and is provided (e.g., pumped) to an ion exchange brine softener 134 (e.g., such as an Amberlite™ IRC747 manufactured by The Dow Chemical Company of Midland, Mich.) where a substantial portion (e.g., approximately greater than 99%) of the calcium and magnesium are removed. Dilute HCl 98 is provided via an input 136 and NaOH 138 (e.g., approximately 4 wt %) is provided via an input 140 to the softener 134. The HCl 98 and the NaOH 138 are used to regenerate the ion exchange brine softener 134. The ion exchange brine softener 134 provides an output 142 of a high concentration NaCl brine 144. The high concentration NaCl brine 144 may include approximately 150 to 300 g/l NaCl. In certain embodiments, the NaCl brine 144 may be provided to the HCl and NaOH production system 66 to aid in producing HCl and NaOH. Furthermore, the NaCl brine 144 may be used to regenerate a second ion exchange softener 162, such as in brackish water feed brines. Moreover, the NaCl brine 144 may be used to produce a high purity salt for a chlor alkali plant, bleach plant, mixed oxidant plant, other chemical and industrial uses, and/or for any suitable purpose. As illustrated, a purge stream may provide the NaCl brine 144 to the second ED unit 130. The pH of the purge stream may be controlled to approximately 2.5 by HCl 98 injection, thereby converting residual fluoride to hydrogen fluoride (HF) and inhibiting fluorite scaling or NaCl brine contamination with fluoride. In certain embodiments, RO permeate or other low sulfate, low silica, low boric acid containing water may be added to prevent gypsum scaling if there is significant leakage of sulfate through the monovalent anion permselective membrane in the first ED unit 126. A low volume softener reject stream containing the calcium and magnesium may be provided by an output 146 and recycled directly to the settler 114 of the gypsum removal system 112.

The second ED unit 130 produces a concentrated $CaCl_2$, $MgCl_2$ brine stream low in NaCl (e.g., mineral solution) that is provided via an output 148. The output 148 is recirculated to the first ED unit 126 to aid in further extraction of the NaCl and the production of the high concentration NaCl brine 144. Furthermore, the output 148 is provided to a magnesium hydroxide removal system 150. As illustrated, the ED system 124 is fluidly coupled to the magnesium hydroxide removal system 150. In some embodiments (e.g., brackish water), the brine stream may contain approximately 500 to 2,000 wppm $SO_4$ and/or approximately 500 to 2000 wppm Mg, while in other embodiments (e.g., seawater), the brine stream may contain approximately 1,500 to 4,000 wppm $SO_4$ and/or approximately 600 to 2500 wppm Mg. Furthermore, the brine stream may have a pH of approximately 6. Moreover, the brine stream may include approximately 40 to 60 g/l TDS. In certain embodiments, the magnesium hydroxide removal system 150 may include a mixer (e.g., mixer 113), a settler (e.g., settler 114), and a filter (e.g., filter 115) to facilitate removal of the magnesium hydroxide from the concentrated $CaCl_2$, $MgCl_2$ brine stream (e.g., feed stream). In some embodiments, the magnesium hydroxide removal system 150 may be configured to remove approximately 90 to 98% of Mg from the brine stream.

The low NaCl concentrated $CaCl_2$/$MgCl_2$ product brine from the ED system 124 is enriched in magnesium and lean in sulfate due to the upstream gypsum removal system 112, and the ED system 124. In certain embodiments, the brine provided to the output 148 may be approximately 1 to 15% of the brine stream 30 provided to the mineral removal system 32. The lime based material 40 (e.g., lime, dolomitic lime, etc.) is provided to the magnesium hydroxide removal system 150 via an input 152 to precipitate magnesium hydroxide. A similar arrangement to the gypsum removal system 112 (e.g., mixer 113, settler 114, filter 115, etc.) may be used to produce a washed magnesium hydroxide filter cake and a low magnesium effluent brine. A portion of the magnesium hydroxide removal system 150 effluent may be used to produce a slaked lime slurry to facilitate lime mixing with the $CaCl_2$/$MgCl_2$ ED product brine. In addition to the lime based material 40, excess NaOH 138, such as from the HCl and NaOH production system 66, may be provided to the magnesium hydroxide removal system 150 via an input 154, thereby facilitating a reduction in the lime based material 40 and/or reducing the CaCl$_2$ export for brines with high (Ca+Mg) to SO$_4$ molar feed ratios (e.g., where the ratio of (Ca+Mg) to SO$_4$ is greater than approximately 1.0).

Overflow from a settler of the magnesium hydroxide removal system 150 may provide an output 155 of concentrated CaCl$_2$ brine that is recycled back to the gypsum removal system 112. The CaCl$_2$ in the brine combines with sulfate in the primary gypsum settler 114 to facilitate precipitation of gypsum 46. In certain embodiments, the output 155 may have a pH of approximately 10. The magnesium hydroxide removal system 150 outputs magnesium hydroxide slurry 156 via an output 158. In certain embodiments, the magnesium hydroxide slurry 156 may include greater than approximately 98 wt % magnesium oxide (MgO) on a calcinated basis.

Returning to the first ED unit 126, the first ED unit 126 provides an ED dilute stream (e.g., a substantially sulfate hardness free sodium sulfate solution) to an output 160. Moreover, for low salinity brackish water feeds (e.g., NaCl less than approximately 10 g/l) provided to the mineral removal system 32, the ED diluate stream from the first ED unit 126 has a TDS content of less than approximately 7 g/l (e.g., 5 g/l). Accordingly, as illustrated, the ED diluate stream from the first ED unit 126 is provided to a strong acid cation (SAC) ion exchange softener 162. The lower TDS content of the ED diluate stream enables the use of SAC ion exchange softening resins which are regenerated using NaCl brine 144, as discussed previously. The SAC ion exchange softener 162 exchanges calcium and magnesium ions in the ED diluate stream for sodium and inhibits gypsum scaling in a downstream NF system 164 that receives an output 166 from the SAC ion exchange softener 162. As illustrated, a purge stream of the NaCl brine 144 may be provided to the NF system 164 in conjunction with the output 166 to facilitate descaling.

All or part of the ED diluate stream is routed to the SAC ion exchange softener 162 based a scaling potential of the NF system 164. Relatively high sulfate hardness levels in the SAC softener effluent 166 (e.g., approximately 10-100 ppm) are used to minimize brine consumption. SAC ion exchange softener 162 resins are regenerated using the NaCl brine 144, and the spent brine from regeneration containing mainly CaCl$_2$ and MgCl$_2$ with residual NaCl is routed to the second ED unit 130, thereby facilitating recycling of the residual NaCl for producing the concentrated CaCl2, MgCl2 brine low in NaCl suitable for feed to the magnesium hydroxide removal system 150. As may be appreciated, for seawater based NF brines or high salinity feed brines, softening is not required to inhibit gypsum scaling in the downstream NF system 164. This is because the elevated NaCl content in the NF feed and non-permeate increases the gypsum solubility, thereby inhibiting scaling in the NF unit.

The ED diluate stream from the first ED unit 126, which has been optionally softened by the SAC ion exchange softener 162 is routed to the NF system 164 via outputs 160 and/or 166. In certain embodiments, approximately 60 to 80% of the ED diluate stream permeates the NF. The remaining 20 to 40% NF non-permeate contains substantially all of the sulfate, approximately 60 to 90% of the calcium, approximately 80 to 90% of the magnesium, and approximately 20 to 50% of the NaCl. Thus, a non-permeate stream output from the NF system 164 via output 168 is slightly supersaturated with respect to gypsum 46 (e.g., 1.6 saturation index defined as ion product/Ksp, which corresponds to a dissolved gypsum content of 125% of saturation). Significant scaling does not occur on the NF membranes of the NF system 164 because the kinetics of gypsum crystallization are slow in the NF membranes (e.g., no seed crystals, acidic pH, low mixing turbulence, etc.).

Periodically (e.g., approximately every 6-8 hours) a slug of high purity NaCl brine (e.g., 100-200 g/l NaCl, less than 50 ppm Ca, less than 20 ppm SO4) is injected individually into each NF element of the NF system 164. This may result in a brief (e.g., 30 second) period of reverse flow across the NF membrane in a direct osmosis, high salinity process. The high purity NaCl brine directs the gypsum microcrystals to be removed from the surface of the NF elements and dissolved in the NaCl brine, thereby inhibiting long term growth of gypsum scale since the seed microcrystals are removed before scaling kinetics can accelerate. The supersaturated NF non-permeate containing substantially all of the sulfate is recycled to the settler 114 of the gypsum removal system 112 via the output 168. In certain embodiments, the supersaturated NF non-permeate may contain approximately 8,000 to 12,000 wppm SO$_4$, approximately 300 to 500 wppm Ca, approximately 100 to 300 wppm Mg, approximately 0.8 to 1.5 g/l NaCl, and/or approximately 15 to 25 g/l TDS.

An NF permeate stream is provided via an output 170 from the NF system 164. For low salinity brackish water brine feeds the NF permeate stream may have a low TDS and thereby may meet EPA drinking water standards. Furthermore, as may be appreciated, NF membranes with increased NaCl removal may be desirable to produce drinking water with lower TDS content. It should be noted that the selection of the NF membrane may be made so that silica concentration and scaling does not occur on the NF membrane with high NaCl removal.

As illustrated, the NF permeate stream from output 170 is provided to the HCl and NaOH production system 66. The HCl and NaOH production system 66 is used to produce one or more HCl 98 outputs 172 and/or to produce one or more NaOH 138 outputs 174. Furthermore, the NF permeate stream from output 170 may be provided to the first heat exchanger 92 to facilitate heat transfer from the brine stream 30 to the NF permeate. Moreover, the NF permeate stream from output 170 may be provided to a cooling tower 176 where the NF permeate stream is cooled before flowing through the third heat exchanger 96 to facilitate heat transfer from the brine stream 30 to the NF permeate. As illustrated, the cooling tower 176 may also provide a portion of the NF permeate stream to the brine stream 30.

As may be appreciated, arsenic (e.g., as arsenite) in the brine stream 30 (e.g., from brackish groundwater treatment) may pass through the gypsum removal system 112 and the NF system 164, thereby ending up in the NF permeate stream from the output 170. Accordingly, in certain embodiments, the arsenic is not removed by NF membranes. If necessary to meet drinking water standards the arsenic may be removed from the NF permeate stream using an arsenic absorber 178. Within the arsenic absorber 178, the NF permeate stream is chlorinated with chlorine, sodium hypochlorite, and/or mixed oxidant 180 received via an input 182 thereby converting the arsenite to arsenate. The stream is then routed to a granular ferric hydroxide (GFH) or granular ferric oxide (GFO) absorption bed where the arsenate is absorbed and chemically sequestered as non-leachable ferric arsenate. Periodically the spent GFH or GFO may be removed and/or stored onsite for future arsenic reclaiming. Moreover, fresh GFH or GFO may be provided into the absorption beds. The absence of essentially all the sulfate and chloride in the NF permeate water along with its slightly acidic pH (e.g., approximately 5 to 6), make the GFH or GFO absorption of arsenic highly efficient and cost effective. The desalinated water 28 is provided by an output 184 from the arsenic absorber 178. While the arsenic absorber 178 is included in the illustrated embodiment, other embodiments may not include the arsenic absorber 178. In certain embodiments, the desalinated water 28 may contain approximately 50 to 150 mg/l $SiO_2$, approximately 10 to 50 mg/l Ca+Mg, approximately 0.3 to 0.9 g/l NaCl, and/or approximately 500 to 1000 ppm TDS.

In certain embodiments, a slipstream of the softened ED diluate stream from the first ED unit 126 may be routed to a biological or chemical selenium removal system 186. The selenium may be concentrated in this stream because it typically exists as selenate which has similar properties to sulfate. Moreover, the selenium does not permeate NF or anion monovalent permselective ED membranes and is more soluble than sulfate in the presence of calcium. Thus, the low NaCl, sulfate, $MgCl_2$ and $CaCl_2$ concentration in the ED diluate stream provide optimal conditions for the chemical or biological removal processes. For example, in certain embodiments, the ED diluate stream may contain approximately 3,000 to 5,000 wppm $SO_4$, approximately 100 to 150 wppm Ca, approximately 25 to 75 wppm Mg, and/or approximately 0.5 to 1.0 g/l NaCl. The selenium removal system 186 is configured to remove selenium from the ED diluate stream, to provide selenium 188 from a first output 190, and to provide a substantially selenium free ED diluate stream to the NF system 164.

Figure 3:
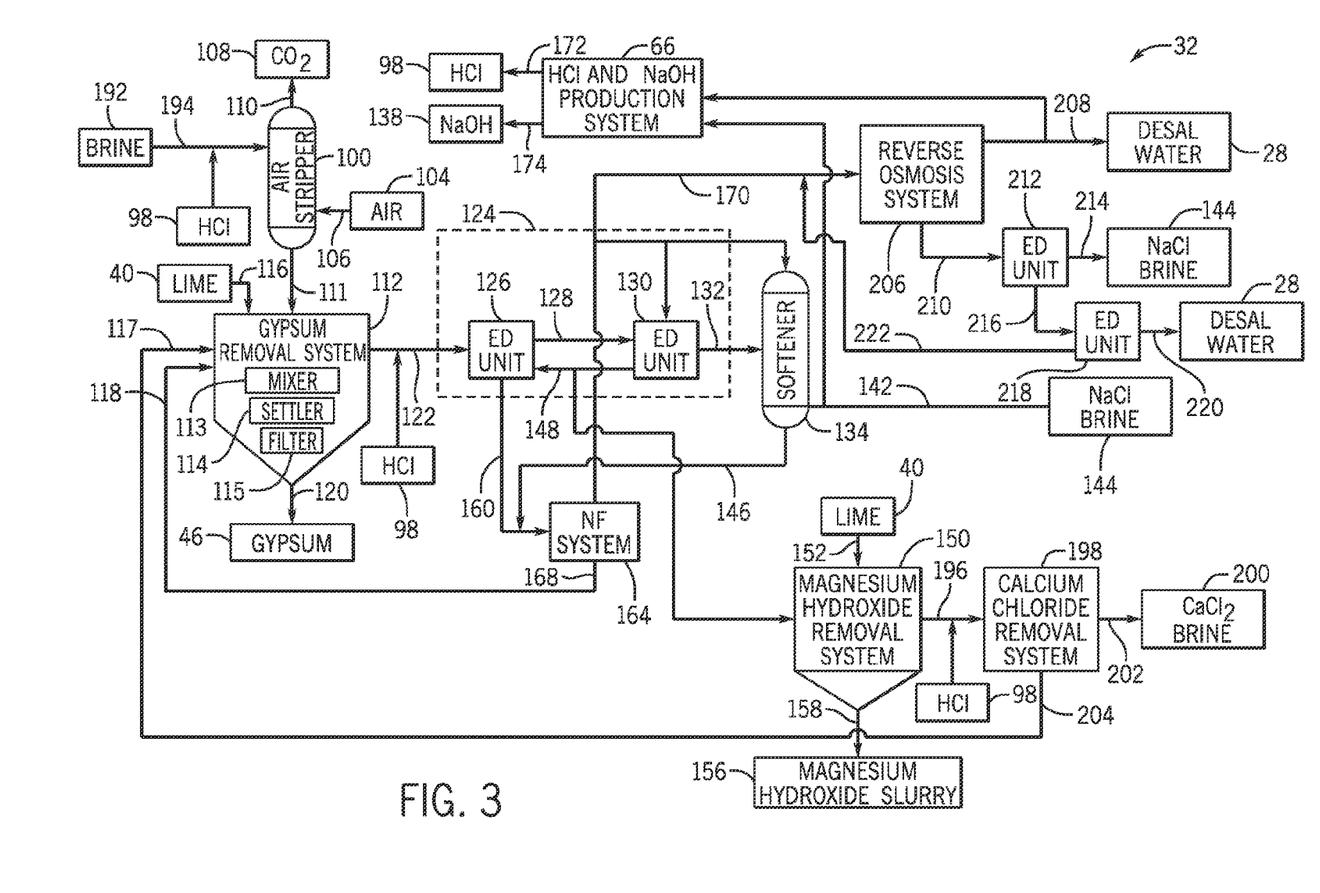
FIG. 3 is a block diagram of another embodiment of a mineral removal system, in accordance with aspects of the present disclosure.

FIG. 3 is a block diagram of another embodiment of the mineral removal system 32. In the illustrated embodiment, a brine stream 192 is provided to the air stripper 100 via an input 194. The brine stream 192 may be received from any suitable source. Furthermore, as may be appreciated, the brine stream may contain various elements and/or compounds. For example, the brine stream may contain NaCl, $SO_4$, Ca, Mg, and/or $SiO_2$. In certain embodiments, the brine stream may contain approximately 25.0 to 35.0 g/l NaCl, approximately 8,000 to 12,000 wppm $SO_4$, approximately 4,000 to 6,000 wppm Mg, approximately 1,200 to 1,800 wppm Ca, and/or approximately 1 to 5 wppm $SiO_2$. Furthermore, in certain embodiments, the brine stream may have a pH range between approximately 4 and 8. Specifically, the brine stream may have a pH of approximately 6.

The air stripper 100 removes $CO_2$ from the brine stream 192 and provides the stripped brine stream 192 to the gypsum removal system 112. Moreover, the gypsum removal system 112 provides the brine stream output 122 to the ED system 124. The brine stream output 122 may have a pH of approximately 8 when it exits the gypsum removal system 112. Accordingly, HCl 98 may be added to the brine stream output 122 to facilitate changing the pH of the brine stream output 122 to a pH of approximately 6. Within the ED system 124, the first ED unit 126 provides the intermediate output 128 to the second ED unit 130. In certain embodiments, the intermediate output 128 includes approximately 170 to 230 g/l TDS.

The second ED unit 130 produces the concentrated $CaCl_2$, $MgCl_2$ brine stream low in NaCl (e.g., mineral solution) that is provided via the output 148. The output 148 is recirculated to the first ED unit 126 to aid in further extraction of the NaCl and the production of the high concentration NaCl brine 144. Furthermore, the output 148 is provided to the magnesium hydroxide removal system 150. In some embodiments, the brine stream may include approximately 100 to 160 g/l TDS. As illustrated, the ED system 124 is fluidly coupled to the magnesium hydroxide removal system 150. Moreover, the magnesium hydroxide removal system 150 may be configured to remove greater than approximately 95% of Mg from the brine stream.

In certain embodiments, all or a portion of the overflow from the settler of the magnesium hydroxide removal system 150 may be filtered and routed via an output 196 to a calcium chloride removal system 198, which may include an ED unit equipped with monovalent anionic selective membranes to extract a concentrated $CaCl_2$ brine 200 (e.g., having approximately 25 to 30 wt %) low in magnesium and sulfate. Furthermore, as illustrated, the magnesium hydroxide removal system 150 is fluidly coupled to the calcium chloride removal system 198. As may be appreciated, the feed stream provided by the output 196 may have a pH of approximately 10 when it exits the magnesium hydroxide removal system 150. Accordingly, HCl 98 may be added to the feed stream to facilitate changing the pH of the feed stream to approximately 8. The concentrated $CaCl_2$ brine 200 may be provided via an output 202 and may be sold for applications such as road dust suppression, for crude oil drilling brine, and/or may be evaporated to produce commercial grade flakes or pellets. Moreover, the calcium chloride removal system 198 may provide $CaCl_2$ via an output 204 to the gypsum removal system 112. Moreover, the $CaCl_2$ provided via the output 204 may include approximately 80 to 100 g/l $CaCl_2$. The calcium chloride removal system 198 may be used for seawater based brines as well as brines with high Ca+Mg to $SO_4$ molar feed ratios.

The ED diluate from the first ED unit 126 is provided to the NF system 164 via the output 164. In certain embodiments, the ED diluate may include approximately 10 to 20 g/l TDS. Moreover, in certain embodiments, approximately 50 to 70% of the ED diluate stream permeates the NF. The remaining 30 to 50% NF non-permeate may be provided to the gypsum removal system 112. Furthermore, in certain embodiments, the ED diluate from the first ED unit 126 may be recycled back to the seawater NF used to provide the brine stream 192 thereby eliminating the need for the NF system 164. However this may increase the size of the seawater NF unit and the NF non-permeate brine flow to the gypsum settler.

The NaCl brine 144 from the second ED unit 130 may have an increased magnesium content and may be pumped to the soft water regenerated ion exchange brine softener 134 (e.g., such as a Recoflo® softener manufactured by Eco-Tec Inc. of Pickering, Ontario, Canada) in which a substantial portion of the residual magnesium and calcium may be removed. A fraction of the NF permeate stream from the output 170 (having a low calcium and magnesium content) may be used to regenerate the ion exchange brine softener 134. The softener reject stream containing the magnesium and calcium is recycled to the NF system 164 where the calcium and magnesium are removed and recycled to the settler 114 of the gypsum removal system 112. The NF permeate stream from the output 170 may also be used by the second ED unit 130. As may be appreciated, in certain embodiments, the NF permeate stream may include approximately 8 to 12 g/l NaCl.

For high salinity low silica feeds and seawater NF brine feeds the NF permeate from the output 170 is routed to a reverse osmosis (RO) system 206 which produces the desalinated water 28 via an output 208. As illustrated, the desalinated water 28 may be provided to the HCl and NaOH production system 66. The RO non-permeate is routed via an output 210 to a third ED unit 212 (e.g., an NaCl brine ED unit) which uses monoselective anionic and cationic permselective membranes to produce a high concentration, high purity product NaCl brine 144 as a concentrate stream that is provided via an output 214. The third ED unit 212 diluate containing the silica, sulfate, calcium and magnesium is provided via an output 216 and routed to a fourth ED unit 218 (e.g., a second brackish water ED unit) which uses monoselective anionic and cationic permselective membranes to produce desalinated water 28 via an output 220 which contains the silica, sulfate, calcium, magnesium with a low NaCl content (e.g., brackish water ED diluate). The brackish water ED diluate received from the output 220 may be combined with the RO permeate from the output 208 to produce a drinking water that meets the EPA TDS standard of 1000 mg/l. Moreover, the brackish water ED concentrate brine is recycled back to the RO feed via an output 222, for recovery of the NaCl.

Figures 4, 6:
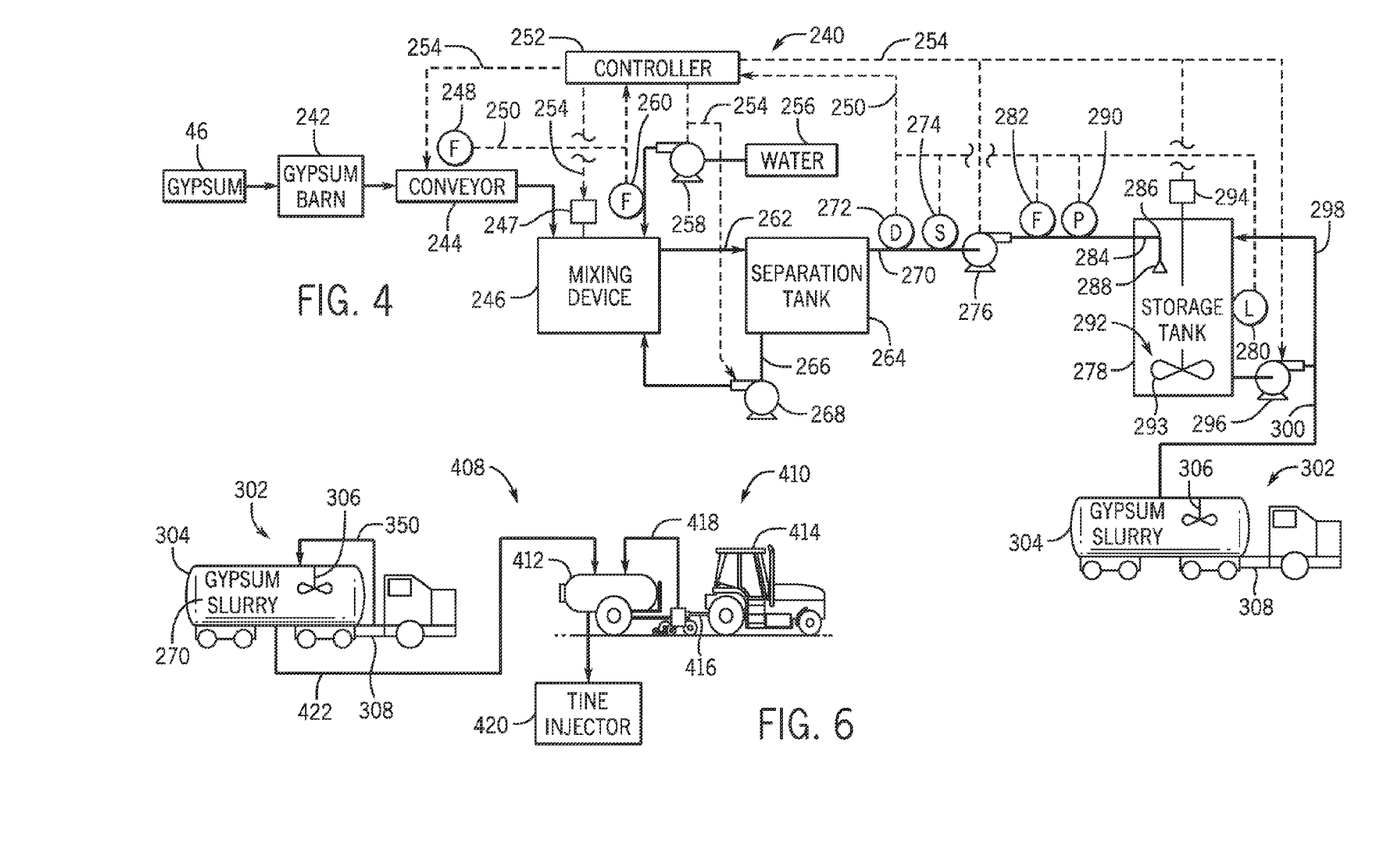
FIG. 4 is a block diagram of an embodiment of a gypsum slurry production system, in accordance with aspects of the present disclosure.
FIG. 6 is a block diagram of an embodiment of a gypsum slurry injection system, in accordance with aspects of the present disclosure.

FIG. 4 is a block diagram of an embodiment of a gypsum slurry production system 240. In the illustrated embodiment, gypsum 46 (e.g., high purity agricultural grade gypsum with approximately greater than 97 wt % gypsum on a dry basis) from the gypsum removal system 112 may be delivered to a covered gypsum barn 242 for storage. The gypsum barn 242 may help protect the gypsum from the weather (e.g., rain, wind, or snow). In certain embodiments, the gypsum 46 may be conveyed to the gypsum barn 242 in the form of a filter cake using a vacuum belt filter or other techniques. In some embodiments, the gypsum 46 (e.g., agricultural grade gypsum) may be a product of flue gas desulfurization, or the gypsum 46 (e.g., agricultural grade gypsum) may be obtained by crushing mined solution grade gypsum.

A conveyor 244 (e.g., a reclaim conveyor, a belt conveyor, a screw conveyor, a hopper, a pneumatic conveyor, a bucket conveyor, a bucket elevator, or any other suitable type of solids transport equipment) may be used to convey the gypsum 46 from the gypsum barn 242 to a mixing device 246, which may be used to grind the gypsum 46, thereby reducing the average particle size of the gypsum 46. In certain embodiments, the mixing device 246 may be an attritor or a vertical ball mill and may be driven by a mixing device motor 247. The operation of the mixing device 246 is described in detail below. In the illustrated embodiment, the conveyor 244 includes a mass flow meter 248 (e.g., a belt scale or a weigh belt feeder) to measure the mass flow rate of the gypsum 46 fed to the mixing device 246. In certain embodiments, the mass flow meter 248 may be a high accuracy (e.g., less than approximately 0.25% error) belt scale with four idlers. As shown in FIG. 4, the mass flow meter 248 may generate an input signal 250 that is transmitted to a controller 252, which may be used to adjust one or more aspects of the gypsum slurry production system 240. For example, based on the information conveyed by the input signal 250 from the mass flow meter 248, the controller 252 may generate an output signal 254 that is transmitted to the conveyor 244. The belt speed of the conveyor 244 may then be adjusted by the controller 252 to control the flow rate of gypsum 46 delivered to the mixing device 246.

In certain embodiments, the controller 252 may execute computer-implemented processes and include apparatuses for practicing those processes. In some embodiments, the controller 252 may include a computer program product having computer program code containing instructions embodied in non-transitory tangible media, such as floppy diskettes, CD-ROMs, hard drives, USB (universal serial bus) drives, or any other computer-readable or machine-readable storage medium, wherein, when the computer program code is loaded into and executed by a computer, the computer becomes an apparatus for practicing certain embodiments. In further embodiments, the controller 252 may include computer program code, for example, whether stored in a storage medium, loaded into and/or executed by a computer, or transmitted over some transmission medium, such as over electrical wiring or cabling, through fiber optics, or via wireless transmission, wherein when the computer program code is loaded into and executed by a computer, the computer becomes an apparatus for practicing certain embodiments. When implemented on a general-purpose processor, the computer program code segments configure the processor to create specific logic circuits. Specifically, the controller 252 may include computer code disposed on a computer-readable storage medium or be a process controller that includes such a computer-readable storage medium. The computer code may include instructions for controlling, operating, and adjusting various aspects of the gypsum slurry production system 240.

In certain embodiments, the controller 252 may be used to approximately match the amount of gypsum slurry produced by the gypsum slurry production system 240 with an average daily gypsum slurry consumption used for local supply. In particular, the gypsum barn 242 may be used to provide inventory to store excess gypsum 46 when the daily gypsum slurry consumption for local supply is less than the gypsum slurry production rate. Similarly, the inventory of the gypsum barn 242 may be used to supply additional gypsum 46 when the required daily slurry consumption used for local supply is more than the gypsum slurry production rate. Thus, use of the gypsum barn 242 allows for an approximately constant rate of production of gypsum 46 by the water processing system 10 or the flue gas desulfurization plant despite a variable gypsum slurry consumption rate, which may be characteristic of the local agricultural market (e.g., a high summer demand and a low winter demand).

As shown in FIG. 4, water 256 may be delivered to the mixing device 246 via a water pump 258. The flow rate of the water 256 to the mixing device 246 may be measured using a water flow meter 260. In certain embodiments, the water flow meter 260 may a high accuracy magnetic flow meter (e.g., less than approximately 1% error). The controller 252 may use the water flow rate information provided by the water flow meter 260 and the gypsum flow rate information provided by the mass flow meter 248 to maintain an approximately constant water to gypsum mass flow ratio of the gypsum slurry, which may be between approximately 1:1 to 0.5:1.

The mixing device 246 shown in FIG. 4 combines the water 256 with the gypsum 46 to produce raw gypsum slurry 262, which may be provided to a separation tank 264. In certain embodiments, the mixing device 246 may include grinding media (e.g., stainless steel, chrome steel, tungsten carbide, ceramic, or zirconium oxide) and a plurality of cross arms rotating at a high speed and driven by motor 247 to impart both shearing and impact forces on the gypsum 46. Thus, the mixing device 246 fully wets the gypsum 46 with the water 256 and selectively grinds any particles of the gypsum 46 greater than a selected size to produce a stable, pumpable gypsum slurry. The separation tank 264 may be used to return particles of gypsum 46 greater than the selected size back to the mixing device 246 for further grinding. In other words, the larger particles of gypsum 46 may tend to settle out to the bottom of the separation tank 264 and a recirculated gypsum slurry 266 may be returned to the mixing device 246 via a recirculation pump 268. Thus, the separation tank 264 separates the recirculated gypsum slurry 266 from a gypsum slurry 270 with all or most particles less than the selected size. In certain embodiments, the speed of the recirculation pump 268 may be adjusted to control the recirculation flow of the recirculated gypsum slurry 266 to the mixing device 264 to achieve a desired maximum particle size of the gypsum slurry 270, such as a maximum particle size of less than approximately 0.074 mm (e.g., approximately 200 mesh).

In certain embodiments, a density meter 272 may be used to measure a density of the gypsum slurry 270. For example, the density meter may be an online ultrasonic density meter with an accuracy within approximately 0.1%. Use of the density meter 272 may allow for accurate online measurement and confirmation of the concentration of the gypsum slurry 270. In other words, the density of the gypsum slurry 270 may be used to provide an indication of the concentration (e.g., gypsum content) of the gypsum slurry 270. Further, the concentration of the gypsum slurry 270 indicated by the density meter 272 may be compared with the concentration determined using the flow rates of the gypsum 46 and the water 256. The online density measurement may be calibrated with periodic offline samples analyzed with a loss in weight drying scale, which directly determines gypsum solids content. The controller 252 uses the calibrated measurements of the online density meter 272 to adjust the ratio of water 256 to gypsum 46. Using this process may enable the suspended solids concentration of the gypsum slurry 270 to be measured and controlled with a less than approximately 1 wt % error of a desired setpoint.

In certain embodiments, a particle size meter 274 may be used to measure the maximum particle size of the gypsum slurry 270. For example, the particle size meter 274 may be a laser or ultrasonic online particle size meter. The particle size meter 274 may be used to confirm that the maximum particle size of the gypsum slurry 270 is less than a desired value, such as less than approximately 0.074 mm (e.g., approximately 200 mesh). If the maximum particle size indicated by the particle size meter 274 is greater than the desired value, the controller 252 may be used to increase the speed of the recirculation pump 268, thereby increasing the flow rate of the recirculated gypsum slurry 266 from the separation tank 264 to the mixing device 246. The increased flow rate of the recirculated gypsum slurry 266 may help reduce the maximum particle size of the gypsum slurry 270.

As shown in FIG. 4, the gypsum slurry 270 from the top of the separation tank 264 may be pumped by a gypsum slurry pump 276 to a storage tank 278. The controller 252 may be used to control a speed of the gypsum slurry pump 276 to maintain an approximately constant fluid level in the separation tank 264. In addition, a storage tank level meter 280 may be used to provide an indication of the level of the gypsum slurry 270 in the storage tank 278. The level of the storage tank 278 may be used by the controller 252 to set the flow rate of the gypsum 46 through the conveyor 244. The controller 252 may maintain an approximately constant level in the storage tank 278 by adjusting the flow rate of the gypsum 46 without exceeding a maximum flow rate limit, which may be set by a physical capacity limit of the mixing device 246 and/or separation tank 264 or a maximum expected daily average sales volume of gypsum slurry. In addition, a gypsum slurry flow meter 282 may be disposed downstream of the gypsum slurry pump 276 to measure a flow rate of the gypsum slurry 270. In certain embodiments, the gypsum slurry flow meter 282 may be able to measure the flow rate of the gypsum slurry 270 with less than approximately 1% error. In some embodiments, a horizontal pipe 284, elbow 286, and a downward-facing discharge nozzle 288 may be installed within the storage tank 278 for providing the gypsum slurry 270 from the gypsum slurry pump 276. In certain embodiments, the pipe 284, elbow 286, and nozzle 288 may be ceramic lined (e.g., alumina or tungsten carbide) to inhibit erosion caused by the gypsum slurry 270. In addition, use of the pipe 284, elbow 286, and nozzle 288 may help increase the velocity of the gypsum slurry 270 and the nozzle 288 may direct the gypsum slurry 270 downward into the slurry 270 at the top of the storage tank 278 to inhibit erosion of the interior of the storage tank 278. In some embodiments, the ceramic lined pipe 284, elbow 286, and nozzle 288 may provide a dynamic pressure drop (caused by flow of the gypsum slurry 270) of approximately 30 to 100 kPa.

In the illustrated embodiment, a pressure gauge 290 may be disposed upstream of the pipe 284, elbow 286, and nozzle 288. In certain embodiments, the pressure gauge 290 may be a high accuracy diaphragm isolated pressure gauge. The flow rate provided by the gypsum slurry flow meter 282 and the pressure provided by the pressure gauge 290 may be used by the controller 252 to calculate a viscosity of the gypsum slurry 270. Specifically, the gypsum slurry 270 may be a Bingham plastic fluid operated in the laminar flow regime and thus, the viscosity of the gypsum slurry 270 is proportional to the velocity and pressure drop across the nozzle 288. The controller 252 may be used to adjust the flow rate of the recirculated gypsum slurry 266 to help maintain an approximately constant viscosity of the gypsum slurry 270, such as an apparent viscosity of between approximately 500 to 1000 cP at a pipe velocity of between approximately 1.5 to 3 m/s. In addition, a desired water to gypsum mass flow ratio set point within the controller 252 may be set sufficiently high so that both the desired viscosity and the desired maximum particle size of the gypsum slurry 270 may be met with minimal adjustments to the flow rate of the recirculated gypsum slurry 266. This may allow the flow rate of the recirculated gypsum slurry 266 and the maximum particle size of the gypsum slurry to be adjusted to help maintain an approximately constant viscosity of the gypsum slurry 270.

In certain embodiments, the storage tank 278 may be a flat bottom tank with a length to diameter (L/D) ratio between approximately 1:1 to 1:1.1. In addition, the storage tank 278 may include an agitator 292 driven by a motor 294. The agitator 292 may include a slow speed (e.g., between approximately 0.3 to 1 m/s tip speed), large diameter (e.g., approximately 80% of tank diameter) single level impeller 293. The impeller 293 of the agitator 292 may be located near the bottom of the storage tank 278 and be designed to lift the gypsum slurry 270 upwards, thereby minimizing erosion of the bottom of the storage tank 278. In certain embodiments, the impeller 293 does not provide top to bottom mixing of the gypsum slurry 270 because the storage tank 278 includes a recirculation pump 296. As shown in FIG. 4, the recirculation pump 296 may be used to pump the gypsum slurry 270 from the bottom of the storage tank 278 to the top of the storage tank 278 via a recirculation line 298. In some embodiments, a capacity of the storage tank 278 may be selected to allow for daytime-only deliveries of the gypsum slurry 270. For example, the capacity of the storage tank 278 may be greater than approximately 19,000 liters (e.g., approximately 120% of a slurry tank truck capacity), which may allow for approximately 16 hours of production. The gypsum barn 242 provides additional storage capacity as it may be more cost effective to store large volumes of gypsum 46 as a dry solid in the gypsum barn 242 compared to storage of the gypsum slurry 270 in the storage tank 278.

As illustrated in FIG. 4, the recirculation pump 296 may be used to periodically load slurry tank trucks 302 via a transfer line 300. In certain embodiments, the capacity of a container 304 of the slurry tank truck 302 may be between approximately 13,200 to 17,000 liters. The slurry tank truck 302 may be equipped with internal hydraulically driven mixers 306 to help prevent settling of the gypsum slurry 270 during transportation. As described below, the slurry tank truck 302 may be used to transport the gypsum slurry 270 to regional agricultural or municipal (e.g., reclaimed water users) gypsum slurry users. In certain embodiments, the slurry tank truck 302 include a vacuum pump/air compressor 308, which may used to pressurize the container 304 to a suitable pressure (e.g., approximately 200 kPa) during unloading of the gypsum slurry 270.

Figure 5:
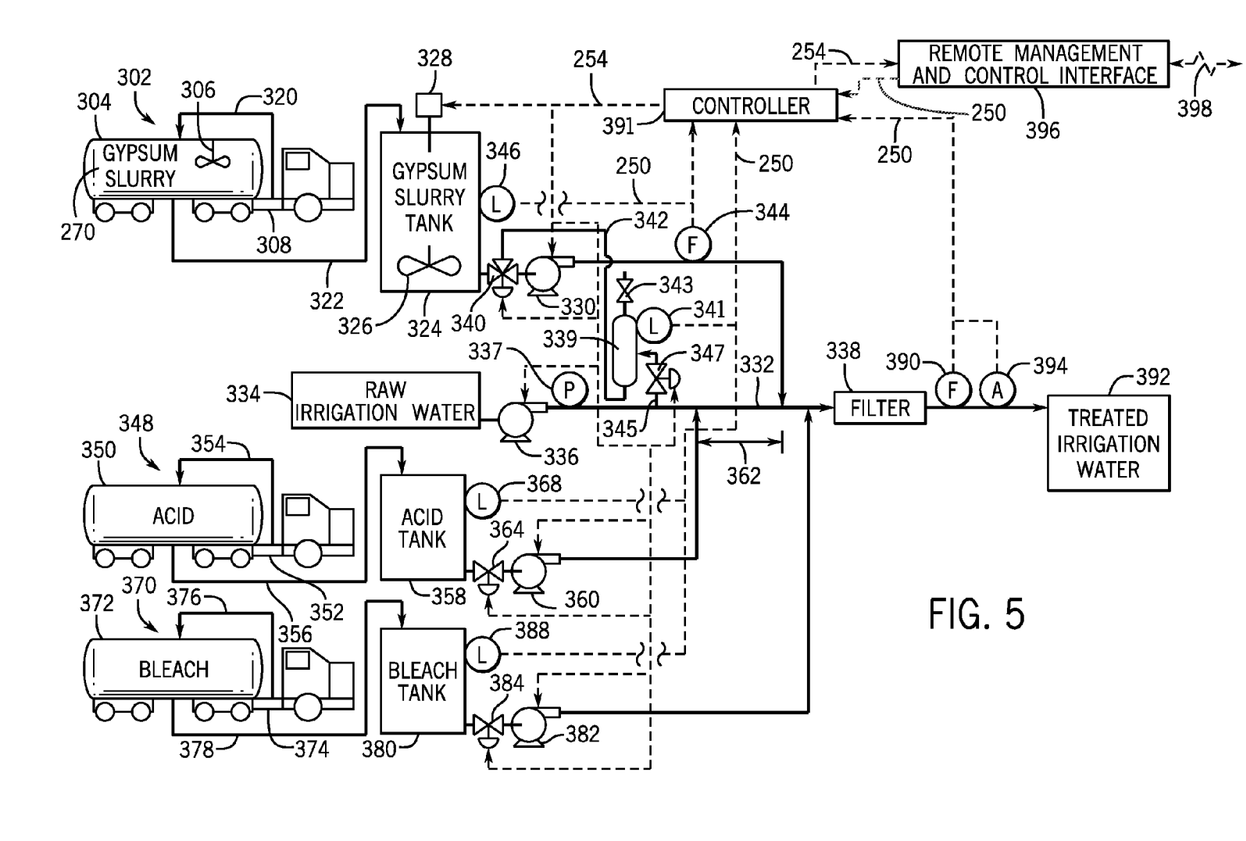
FIG. 5 is a block diagram of an embodiment of an irrigation water system using a gypsum slurry, in accordance with aspects of the present disclosure.

FIG. 5 is a block diagram of an embodiment of an irrigation water system 310 using the gypsum slurry 270 produced by the gypsum slurry production system 240. As shown in FIG. 5, the vacuum pump/air compressor 308 may be used to unload the gypsum slurry 270. Specifically, the slurry tank truck 302 may include an air line 320 that enables compressed air from the vacuum pump/air compressor 308 to push or force the gypsum slurry 270 out of the slurry tank truck 302. For example, the gypsum slurry 270 from the bottom of the slurry tank truck 302 may be connected by a hose (e.g., between approximately 10 to 15 cm in diameter) to a gypsum slurry tank intake line 322, which routes the gypsum slurry 270 from the bottom of the slurry tank truck 302 to the top of a slurry receiving tank 324 at the end user location.

In certain embodiments, the slurry receiving tank 324 may be a flat bottom tank with an L/D ratio between approximately 1:1 to 1.1:1 with a slow speed (e.g., between approximately 0.3 to 1 m/s tip speed) large diameter (e.g., approximately 80% of tank diameter) single level impeller 326 driven by a motor 328. The impeller 326 may be located near the bottom of the slurry receiving tank 324 and be designed to lift the gypsum slurry 270 upwards, thereby minimizing erosion of the bottom of the slurry receiving tank 324. In certain embodiments, the impeller 326 does not provide top to bottom mixing because the gypsum slurry 270 from the gypsum slurry production system 240 is maintained at approximately constant slurry concentration, viscosity, and maximum particle size. In some embodiments, a capacity of the slurry receiving tank 324 may be approximately 19,000 liters (e.g., approximately 120% of the capacity of the slurry tank truck 302) with dimensions of approximately 3.4 m in height (e.g., 3 m high liquid level) and 2.9 m in diameter. The relatively small diameter of the slurry receiving tank 324 may be used for the gypsum slurry 270 to help reduce the size of the impeller 326 used to prevent settling of the gypsum slurry 270, without increasing the height of the slurry receiving tank 324 to the point that a gypsum slurry booster pump would be used.

In the illustrated embodiment, a slurry chemical dosing pump 330 (e.g., a variable speed pump) pumps the gypsum slurry 270 from the slurry receiving tank 324 to an irrigation water pipeline 332, which may be pressurized (e.g., between approximately 200 to 345 kPa) using raw irrigation water 334 provided by a raw irrigation water pump 336. As shown in FIG. 5, the gypsum slurry 270 may be injected into the irrigation water pipeline 332 upstream of a filter 338 used to protect the downstream drip irrigation or sprinkler system. In certain embodiments, a low pressure shutoff switch 337 may be used to automatically shut off the irrigation water pump 336 and all other injection pumps (e.g., pumps 330, 360, and 382) upon detecting a low discharge pressure, which may be an indication of a rupture in the downstream irrigation system.

A gypsum slurry three-way solenoid valve 340 may be connected to the slurry receiving tank 324, purge water line 342, and a suction line of the slurry chemical dosing pump 330. The gypsum slurry three-way solenoid valve 340 may provide for automatic purging of the suction line, slurry chemical dosing pump 330, and discharge line whenever the slurry chemical dosing pump 330 is shutdown, slurry plugging is suspected, or a power outage occurs. The three-way solenoid valve 340 may have non-metal wetted parts to inhibit erosion and/or corrosion caused by the gypsum slurry 270. The three-way solenoid valve 340 may be installed with a normally closed port (e.g., gypsum slurry tank 324) on the bottom, a normally open port (e.g., purge water) on the top, and a common port (e.g., pump suction) in the middle. The purge water system is discussed below. The bottom port (e.g., gypsum slurry tank 324) may be rotated to allow the three-way solenoid valve 340 to be directly connected to the gypsum slurry tank 324. This orientation of the three-way solenoid valve 340 may allow gypsum slurry solids in the valve 340 to settle back into the tank 324 when the gypsum slurry port is closed and may allow the purge water to periodically flow downward through the valve 340, thereby flushing any settled solids into the pump 330. In certain embodiments, the three-way solenoid valve 340 may be a model SV73 three-way valve manufactured by the Valcor Engineering Corporation of Springfield, N.J., which may have wetted parts made from Noryl, CPVC, EPDM, or Santoprene. The SV7 three-way valve may be installed with the normally open port (e.g., purge water) on top, the bottom normally closed port (e.g., gypsum slurry) rotated approximately 90 degrees from the normally open port (e.g., purge water), and a common port (pump suction). Both the suction and discharge lines of the slurry chemical dosing pump 330 may be made from a relatively small diameter high-pressure fiber reinforced PVC tubing with a velocity between approximately 0.3 to 1.2 m/s to help reduce the potential for erosion and plugging. In certain embodiments, a gypsum slurry flow meter 344 may be used to accurately measure the flow rate of the gypsum slurry 270 from the slurry chemical dosing pump 330 to confirm actual injection rates and/or to confirm that no slurry plugging or check valve deposition has occurred. The slurry chemical dosing pump 330 may be automatically shutdown if the measured slurry flow does not correspond to the pump speed after an automatic purge. For example, the gypsum slurry flow meter 344 may be a magnetic flow meter. In addition, a gypsum slurry level gauge 346 may be used to measure the level in the slurry receiving tank 324. In certain embodiments, the gypsum slurry level gauge 346 may be a non-contact ultrasonic level transmitter. In certain embodiments, a pressurized gypsum purge drum 339 may be used to provide purge water to the three-way solenoid valve 340. The purge drum 339 may be equipped with a level transmitter 341 connected to the controller 391 and may also have an automatic mechanical vacuum relief valve 343 on the top of the drum 339, which may pull air into the drum 339 as the level drops at the end of a purging cycle. A purge drum feed line 345 may be connected to the raw irrigation water line 332. A two-way solenoid valve 347 in the feed line 345 may be activated by the controller 391 to refill and repressurize the purge drum 339 upon low level indicated by level transmitter 341. During a power outage, the fill line two-way solenoid valve 347 is closed (normally de-energized) and the three-way purge solenoid valve 340 isolates the gypsum slurry tank 324 and routes the pressurized purge drum 339 to the pump suction (normally de-energized position). This provides an automatic purge of the gypsum slurry injection pump 330 during a power outage or an irrigation water pump 336 shutdown.

As shown in FIG. 5, dilute hydrochloric acid (e.g., between approximately 5 to 18 wt %) from the water processing system 10 may be delivered by a hydrochloric acid tank truck 348 to the irrigation water system 310. In certain embodiments, the capacity of a container 350 of the hydrochloric acid tank truck 348 may be approximately 22,700 liters. In addition, the interior of the container 350 may be made from a material compatible with hydrochloric acid, such as high density linear polyethylene (HDLPE). In certain embodiments, the hydrochloric acid tank truck 348 may include a vacuum pump/air compressor 352, which may used to pressurize the container 350 to a suitable pressure during unloading of the hydrochloric acid. Specifically, the hydrochloric acid tank truck 348 may include an air line 354 that enables compressed air from the vacuum pump/air compressor 352 to push or force the hydrochloric acid out of the hydrochloric acid tank truck 348. For example, the hydrochloric acid from the bottom of the hydrochloric acid tank truck 348 may be connected by a hose to a hydrochloric acid tank intake line 356, which routes the hydrochloric acid from the bottom of the hydrochloric acid tank truck 348 to the top of a hydrochloric acid tank 358, which may be sized for approximately 27,200 gallons (e.g., approximately 120% of the capacity of the hydrochloric acid tank truck 348).

A hydrochloric acid dosing pump 360 (e.g., a variable speed pump) may be used to inject the dilute hydrochloric acid into the irrigation water pipeline 332 at a distance 362 upstream of the injection point of the gypsum slurry 270. For example, the distance 362 may be greater than approximately 30 pipe diameters. The hydrochloric acid is used when a pH of the raw irrigation water 334 is greater than approximately 7 to help prevent carbonate in the raw irrigation water 334 from reacting with calcium in the dissolved gypsum of the gypsum slurry 270 and causing scaling in the downstream drip irrigation or sprinkler system. The hydrochloric acid is injected well upstream (e.g., at least distance 362) of the gypsum slurry 270 so that the hydrochloric acid is well mixed with the raw irrigation water 334 and neutralizes the carbonate before the gypsum slurry 270 is injected. A hydrochloric acid two-way solenoid valve 364 may be connected to the hydrochloric acid tank 358 and the suction line of the hydrochloric acid dosing pump 360. The two-way solenoid valve 364 may be de-energized (e.g., closed) when the acid dosing pump 360 is shutdown, thereby isolating the acid tank 358 from the pump 360 and preventing backflow of irrigation water into the acid system. In certain embodiments, a hydrochloric acid level gauge 368 may be used to measure the level in the hydrochloric acid tank 358. In certain embodiments, the hydrochloric acid level gauge 368 may be a non-contact ultrasonic level transmitter.

In the illustrated embodiment, dilute bleach solution (e.g., approximately 0.8 wt % sodium hypochlorite) from the water processing system 10 may be delivered by a bleach tank truck 370 to the irrigation water system 310. In certain embodiments, the capacity of a container 372 of the bleach tank truck 370 may be approximately 22,700 liters. In addition, the interior of the container 372 may be made from a material compatible with bleach, such as high density linear polyethylene (HDLPE). In certain embodiments, the bleach tank truck 370 may include a vacuum pump/air compressor 374, which may used to pressurize the container 372 to a suitable pressure during unloading of the bleach. Specifically, the bleach tank truck 370 may include an air line 376 that enables compressed air from the vacuum pump/air compressor 374 to push or force the bleach out of the bleach tank truck 370. For example, the bleach from the bottom of the bleach tank truck 370 may be connected by a hose to a bleach tank intake line 378, which routes the bleach from the bottom of the bleach tank truck 370 to the top of a bleach tank 380, which may be sized for approximately 27,200 gallons (e.g., approximately 120% of the capacity of the bleach tank truck 370).

In other embodiments, concentrated (e.g., approximately 98 wt %) sulfuric acid may be used in the acid injection system instead of hydrochloric acid. In some locations, concentrated sulfuric acid may be available at a lower delivered cost than the dilute hydrochloric acid produced in the desalination plant. High temperature rated (e.g., greater than approximately 260 degrees Celsius) PTFE tubing may be used for concentrated sulfuric acid because of the potential release of heat from concentrated sulfuric acid dilution, which may occur if irrigation water back flows into the acid injection line.

A bleach dosing pump 382 (e.g., a variable speed pump) is used to inject the dilute bleach solution into the irrigation water pipeline 332 downstream of the injection point of the gypsum slurry 270, but upstream of the filter 338. Injection of the bleach may help provide disinfection for the raw irrigation water 334 and may be important for reclaimed water use because bleach helps prevent the formation of biological slimes in the filter 338 and/or the downstream drip irrigation or sprinkler system. A bleach two-way solenoid valve 384 may be connected to the bleach tank 380 and the suction line of the bleach dosing pump 382. The two-way solenoid valve 384 may be de-energized (e.g., closed) when bleach dosing pump 382 is shutdown, thereby isolating the bleach tank 380 from the pump 382 and preventing backflow of irrigation water into the bleach system. In certain embodiments, a bleach level gauge 388 may be used to measure the level in the bleach tank 380. In certain embodiments, the bleach level gauge 388 may be a non-contact ultrasonic level transmitter.

In the illustrated embodiment, a filtered irrigation water flow meter 390 is used to measure a flow rate of a treated irrigation water 392, which is then used by an irrigation controller 391 to adjust the injection rates of the gypsum slurry 270, hydrochloric acid, and/or bleach, as described in detail below. The treated irrigation water 392 may be analyzed using an online analyzer 394 to provide the irrigation controller 391 with information such as, but not limited to, calcium composition, pH, and free chlorine.

In certain embodiments, the irrigation controller 391 may be a remotely accessible building automation type programmable logic controller (PLC) and is used to control the injection rate of the gypsum slurry 270, hydrochloric acid, and/or bleach. Electronic speed (frequency) controls may be used to adjust speeds of the slurry chemical dosing pump 330, hydrochloric acid dosing pump 360, and/or bleach dosing pump 382 based on the output signal 254 from the irrigation controller 391. In addition, the irrigation controller 391 may be used to automatically shutdown, isolate, and/or purge the gypsum slurry, hydrochloric acid, and bleach injection systems when the flow rate of the treated irrigation water 392 falls below a minimum threshold for injecting the hydrochloric acid and bleach. In other respects, the irrigation controller 391 may be similar to the controller 252 discussed in detail above.

In certain embodiments, the irrigation controller 391 may receive a variety of input signals 250 from the irrigation water system 310. Examples of the input signals 250 include, but are not limited to, a flow rate of the gypsum slurry (e.g., as measured by gypsum slurry flow meter 344), a flow rate of the treated irrigation water 392 (e.g., as measured by filtered irrigation water flow meter 390), a minimum flow rate of the treated irrigation water 392 (e.g., as provided by a minimum flow switch), a calcium content of the treated irrigation water 392 (e.g., as provided by online analyzer 394), a free chlorine content of the treated irrigation water 392 (e.g., as provided by online analyzer 394), a pH of the treated irrigation water 392 (e.g., as provided by online analyzer 394), a level of the gypsum slurry 270 in the slurry receiving tank 324 (e.g., as provided by gypsum slurry level gauge 346), a level of the hydrochloric acid in the hydrochloric acid tank 358 (e.g., as provided by hydrochloric acid level gauge 368), a level of the bleach in the bleach tank 380 (e.g., as provided by bleach level gauge 388), minimum and maximum currents of the raw irrigation water pump 336 (e.g., as provided by current switches), and/or minimum and maximum currents of the gypsum impeller motor 328 (e.g., as provided by current switches).

In addition, the irrigation controller 391 may provide a variety of output signals 254 to the irrigation water system 310. Examples of the output signals 254 include, but are not limited to, a speed of the slurry chemical dosing pump 330, a speed of the hydrochloric acid dosing pump 360, a speed of the bleach dosing pump 382, a stop signal of the slurry chemical dosing pump 330, a stop signal of the hydrochloric acid dosing pump 360, a stop signal of the bleach dosing pump 382, a position of the gypsum slurry three-way solenoid valve 340, a position of the hydrochloric acid three-way solenoid valve 364, and/or a position of the bleach three-way solenoid valve 384.

In certain embodiments, the irrigation controller 391 may also receive input signals 250 form and/or transmit output signals 254 to a remote management and control interface 396. For example, the irrigation controller 391 may have an Ethernet connection that allows the irrigation controller 391 to connect to a wireless 3G or 4G internet router. Thus, the irrigation controller 391 may send and receive information wirelessly 398 to a remote monitoring site over the internet.

In certain embodiments, the irrigation controller 391 may control the flow of the gypsum slurry 270, hydrochloric acid, and/or bleach based on a flow ratio between the measured flow rate of the treated irrigation water 392 and the flow of the gypsum slurry 270, hydrochloric acid, and/or bleach. The setpoints for each of the flow ratios may be automatically adjusted by the irrigation controller 391 within a fixed range based on feedback from the online analyzer 394. Thus, the irrigation controller 391 may take advantage of the redundancy of monitoring both injection flow ratios and treated water analysis to overcome any reliability or accuracy issues associated with the online analyzer 394. In addition, the irrigation controller 391 may shutdown one or all of the injection pumps 330, 360, and 382 or purge the slurry chemical dosing pump 330 if a fault condition is detected (e.g., a low flow rate of gypsum slurry 270 versus pump speed, a low pH, a high chlorine, a flow injection ratio vs. treated water analyzer deviation, an irrigation water flow meter and flow switch deviation, a gypsum slurry motor 328 high or low current). Further, the irrigation water system 310 may be remotely monitored by a central monitoring location or by an end user with a standard smartphone via the remote management and control interface 396. For example, the central location and regional plant may monitor the levels in each of the tanks 324, 358, and 380 and dispatch the tank trucks 302, 348, and 370 to maintain supplies of the gypsum slurry 270, hydrochloric acid, and bleach in the tanks 324, 358, and 380 (with end user concurrence). In some embodiments, redundant irrigation water flow meters 390 may be used so that hydrochloric acid and bleach are not injected without a minimum flow of raw irrigation water 334. Embodiments may also include additional mechanical check valves, drain valves, vacuum relief valves, and/or other mechanical valves to comply with federal, state, and local regulations. These additional valves are redundant to the automatic electronic controls described above and provide additional safeguards against irrigation, well water, and/or feed chemical contamination.

FIG. 6 is a block diagram of an embodiment of a gypsum slurry injection system 408. As shown in FIG. 6, the gypsum slurry 270 may be delivered to one or more tine injection tank trailers 410, which may include a container 412 that is towed through the fields before planting or during orchard dormant phase by a tractor 414 or similar vehicle. In certain embodiments, the tine injection tank trailer 410 may include a vacuum pump/air compressor 416, which may used to pressurize the container 412 to a suitable pressure (e.g., between approximately 30 to 210 kPa) during unloading of the gypsum slurry 270. Specifically, the tine injection tank trailer 410 may include an air line 418 that enables compressed air from the vacuum pump/air compressor 416 to push or force the gypsum slurry 270 out the bottom of the tine injection tank trailer 410 through one or more tine injectors 420. The below grade tines of the tine injectors 420 may enable the gypsum slurry 270 to be injected below any surface crusting and directly into the zone of maximum benefit to the plant roots. The tine injection tank trailer 410 may be periodically refilled by a hose 422 (e.g., with a diameter between approximately 10 to 15 cm) through a top fill connection by slurry tank trucks 302 dispatched from the gypsum slurry production system 240 of the water processing system 10.

As described above, certain embodiments of the water processing system 10 may include the gypsum slurry production system 240, which may include the conveyor 244 for providing the gypsum 46, the water pump 258 for providing the water 256, the mixing device 246 for mixing the gypsum 56 with the water 256 to produce the gypsum slurry 270, and the gypsum slurry pump 276 for pumping the gypsum slurry 270 to the storage tank 278. The gypsum slurry 270 may then be transported to the irrigation water system 310 to be injected into the irrigation water pipeline 332 along with hydrochloric acid and bleach produced by the water processing system 10. The resulting treated irrigation water 392 may then be used for downstream drip irrigation or sprinkler systems. Use of the gypsum slurry production system 240 may provide a number of benefits, such as providing a low capital cost, solution grade gypsum slurry injection system for lower water consumption, higher yield drip irrigation systems. In addition, a single plant, namely the water processing system 10, provides the gypsum slurry 270, bleach, and acid for the irrigation water system 310. Any additional capital and operating costs associated with the gypsum slurry production system 240 is offset by a reduction in the capacity or elimination of a solid product gypsum granulating and packaging system. In addition, the bleach and acid production systems are already included in the water processing system 10. Although the transport of the gypsum slurry 270 may involve greater costs than transporting gypsum alone, the water processing system 10 may be located closer to end users than remote high purity gypsum mines. Thus regional distribution of the gypsum slurry 270 via the gypsum slurry production system 240 may achieve a transport cost savings of greater than approximately 80%. Moreover, multiple gypsum slurry injection systems may use the common regional gypsum slurry production system 240 and self unloading tankers 302. Each end user only has the gypsum slurry tank 324 and injection pumps 330, 360, and 382, which may save approximately 50 to 70% of the capital and operating cost compared to a dedicated solids unloading and slurrying system for each end user.

In addition, the controller 252 of the gypsum slurry production system 240 provides several benefits. For example, using gypsum slurry 270 with approximately constant viscosity and concentration enables the multiple end user systems to accurately and reliably deliver gypsum to the raw irrigation water 334, by monitoring only the flow rate of the gypsum slurry 270 with a low cost slurry magnetic flow meter 344. In addition, the gypsum slurry 270 does not settle in the truck 302, tank 324, pump 330, or injection tubing, rapidly dissolves in the raw irrigation water 334, and does not plug the downstream filter 338 or emitters because of the approximately constant viscosity and maximum particle size of the gypsum slurry 270.

Further, generating the hydrochloric acid and bleach using the water processing system 10 may result in reduced transportation distances for the hydrochloric acid and bleach. This allows dilute (e.g., approximately 5 to 18 wt % HCl) acid and bleach (e.g., approximately 0.8 wt % NaOCl) to be delivered at approximately the same cost as remotely produced concentrated acid (e.g., approximately 98 wt % $H_2SO_4$) and bleach (e.g., approximately 12.5 wt %). In addition, use of relatively dilute hydrochloric acid and bleach improves handling safety, pH, and chlorination control, and may reduce or eliminate the need for hazardous protection systems for the bleach because it is considered non-hazardous at a concentration less than approximately 0.8 wt %. Further, controlling the irrigation water system 310 to a pH between approximately 6 to 6.8 enables the bleach to be over 90% effective in generating the required free available chlorine for disinfection. This allows bleach addition to be reduced by approximately 40% compared with untreated irrigation water at a pH of 7.5, reducing both cost and environmental impact. It may also reduce or eliminate the possibility of calcium carbonate scaling due to gypsum (dissolved calcium) addition.

In addition, using the irrigation controller 391 and the remote management and control interface 396 may reduce or eliminate greater than 90% of the staffing costs associated with conventional gypsum, acid, and bleach injection. It also may reduce operating costs approximately 10 to 30% because a desired amount of gypsum, bleach, and acid are added. This may reduce chemical consumption, drip irrigation system maintenance costs, and may maintain optimal agricultural productivity. In addition, the gypsum slurry injection system 408 may provide a high efficiency, underground slurry injection system for locations not equipped with a subsurface drip irrigation system, which may reduce gypsum consumption approximately 50%.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method, comprising:
providing gypsum to a mixing device using a conveyor wherein the mixing device is disposed downstream of and fluidly coupled to the conveyor;
mixing the gypsum with a fluid in the mixing device to produce a first gypsum slurry;
directing the first gypsum slurry to a separation tank fluidly coupled to the mixing device;
separating first gypsum particles having a first particle size from second gypsum particles having a second particle size, greater than the first particle size, in the separation tank to generate a second gypsum slurry and a third gypsum slurry, wherein the second gypsum slurry comprises the first gypsum particles, and the third gypsum slurry comprises the second gypsum particles;
supplying the second gypsum slurry to a storage tank via a first slurry passage fluidly coupling the separation tank and the storage tank; and
recirculating the third gypsum slurry to the mixing device via a second slurry passage fluidly coupling the separation tank and the mixing device.

2. The method of claim 1, wherein providing the gypsum to the mixing device comprises measuring a first rate that the gypsum is provided to the mixing device using a mass flow meter.

3. The method of claim 2, comprising measuring a second rate that the fluid is provided to the mixing device using a flow meter.

4. The method of claim 3, comprising controlling the first rate and the second rate to obtain a predetermined ratio of a first quantity of the gypsum relative to a second quantity of the fluid using a controller.

5. The method of claim 1, wherein the fluid comprises water.

6. The method of claim 1, comprising measuring a density of the second gypsum slurry using a density meter before supplying the second gypsum slurry to the storage tank.

7. The method of claim 1, comprising measuring a maximum particle size of the first gypsum slurry using a particle size meter.

8. The method of claim 1, wherein mixing the gypsum with the fluid to produce the first gypsum slurry comprises mixing the gypsum with the fluid using an attritor or a vertical ball mill.

9. The method of claim 1, comprising:
providing a lime based material to a gypsum removal system; providing a carbon dioxide-stripped brine stream to the gypsum removal system;
providing a concentrated calcium chloride brine to the gypsum removal system; providing a sodium sulfate rich brine to the gypsum removal system;
providing hydrochloric acid to the gypsum removal system; and
producing the gypsum and a substantially gypsum free brine stream output using the gypsum removal system.

10. The method of claim 1, wherein the gypsum comprises greater than approximately 97 wt % gypsum on a dry basis.

11. A method, comprising: providing a raw irrigation water to an irrigation water pipeline at a raw irrigation water injection point using a raw irrigation water pump; providing an acid to the irrigation water pipeline at an acid injection point downstream of the raw irrigation water injection point using an acid pump; providing a gypsum slurry to the irrigation water pipeline at a gypsum slurry injection point downstream of the acid injection point using a gypsum slurry pump; providing a bleach to the irrigation water pipeline at a bleach injection point using a bleach pump to produce a raw irrigation water mixture; and filtering the raw irrigation water mixture using a filter to produce a treated irrigation water.

12. The method of claim 11, comprising: receiving the acid via an acid tanker truck from a brackish water electrodialysis plant; receiving the gypsum slurry via a gypsum slurry tanker truck from the brackish water electrodialysis plant; and receiving the bleach via a bleach tanker truck from the brackish water electrodialysis plant.

13. The method of claim 11, comprising remotely controlling the raw irrigation water pump, the acid pump, the gypsum slurry pump, the bleach pump, or any combination thereof, using a controller.

14. The method of claim 11, comprising receiving the gypsum slurry from a gypsum slurry production system that comprises: a conveyor providing gypsum, a pump providing a fluid, a mixing device configured to mix the gypsum provided by the conveyor with the fluid provided by the pump to produce the gypsum slurry, and a slurry pump configured to pump the gypsum slurry from the mixing device to a storage tank.

* * * * *